(12) United States Patent
Pargoe et al.

(10) Patent No.: US 11,905,013 B2
(45) Date of Patent: Feb. 20, 2024

(54) SYSTEMS, DEVICES, AND/OR METHODS FOR MANAGING DRONE TETHERING

(71) Applicant: Drone Delivery Systems Corporation, Midlothian, VA (US)

(72) Inventors: Brandon Thomas Pargoe, Midlothian, VA (US); William Stavanja, Whitsett, NC (US); Danny Neal, San Martin, CA (US); Charles Neal, San Martin, CA (US)

(*) Notice: Subject to any disclaimer, the term of this patent is extended or adjusted under 35 U.S.C. 154(b) by 445 days.

(21) Appl. No.: 16/846,280

(22) Filed: Apr. 11, 2020

(65) Prior Publication Data

US 2021/0316858 A1 Oct. 14, 2021

(51) Int. Cl.
*B64C 39/02* (2023.01)
*H04W 4/80* (2018.01)
*B64U 101/60* (2023.01)

(52) U.S. Cl.
CPC ............ *B64C 39/024* (2013.01); *H04W 4/80* (2018.02); *B64U 2101/60* (2023.01); *B64U 2201/202* (2023.01)

(58) Field of Classification Search
CPC .. H04W 4/80; B64C 39/024; B64C 2201/128; B64U 2101/60; B64U 2201/202
See application file for complete search history.

(56) References Cited

U.S. PATENT DOCUMENTS

| | | | |
|---|---|---|---|
| 2016/0159496 A1* | 6/2016 | O'Toole | B64C 39/024 244/110 E |
| 2017/0090484 A1* | 3/2017 | Obaidi | B64C 39/024 |
| 2017/0092140 A1* | 3/2017 | Ishihara | G08G 5/0039 |
| 2017/0137124 A1* | 5/2017 | Walker | A61B 5/08 |
| 2018/0050800 A1* | 2/2018 | Boykin | G10L 25/51 |
| 2018/0105289 A1* | 4/2018 | Walsh | E06B 7/32 |
| 2019/0047698 A1* | 2/2019 | Jassowski | G05D 1/104 |
| 2019/0283871 A1* | 9/2019 | Wieczorek | B64C 27/08 |

* cited by examiner

*Primary Examiner* — Raymond S Dean
(74) *Attorney, Agent, or Firm* — Ritchison Law Offices, PC; John D Ritchison

(57) ABSTRACT

Certain exemplary embodiments can provide a method, which comprises causing an article to be picked up and delivered via a working drone substantially without human intervention. The working drone is coupled to a support drone via a tether. The working drone is controlled via a wireless communication system that transmits signals from the support drone to the working drone. The wireless communication system constructed to communicate with a box that receives deliveries via the drone.

7 Claims, 23 Drawing Sheets
(9 of 23 Drawing Sheet(s) Filed in Color)

1000

1000

SYSTEMS, DEVICES, AND/OR METHODS FOR MANAGING DRONE TETHERING

BRIEF DESCRIPTION OF THE DRAWINGS

The patent or application file contains at least one drawing executed in color. Copies of this patent or patent application publication with color drawings will be provided by the Office upon request and payment of the necessary fee. A wide variety of potential practical and useful embodiments will be more readily understood through the following detailed description of certain exemplary embodiments, with reference to the accompanying exemplary drawings in which:

FIG. 19B is a side view of an exemplary embodiment of a system 19500.

DETAILED DESCRIPTION

Certain exemplary embodiments can provide a method, which comprises causing an article to be picked up and delivered via a working drone substantially without human intervention. The working drone is coupled to a support drone via a tether. The working drone is controlled via a wireless communication system that transmits signals from the support drone to the working drone. The wireless communication system constructed to communicate with a box that receives deliveries via the drone.

Figure 1A:
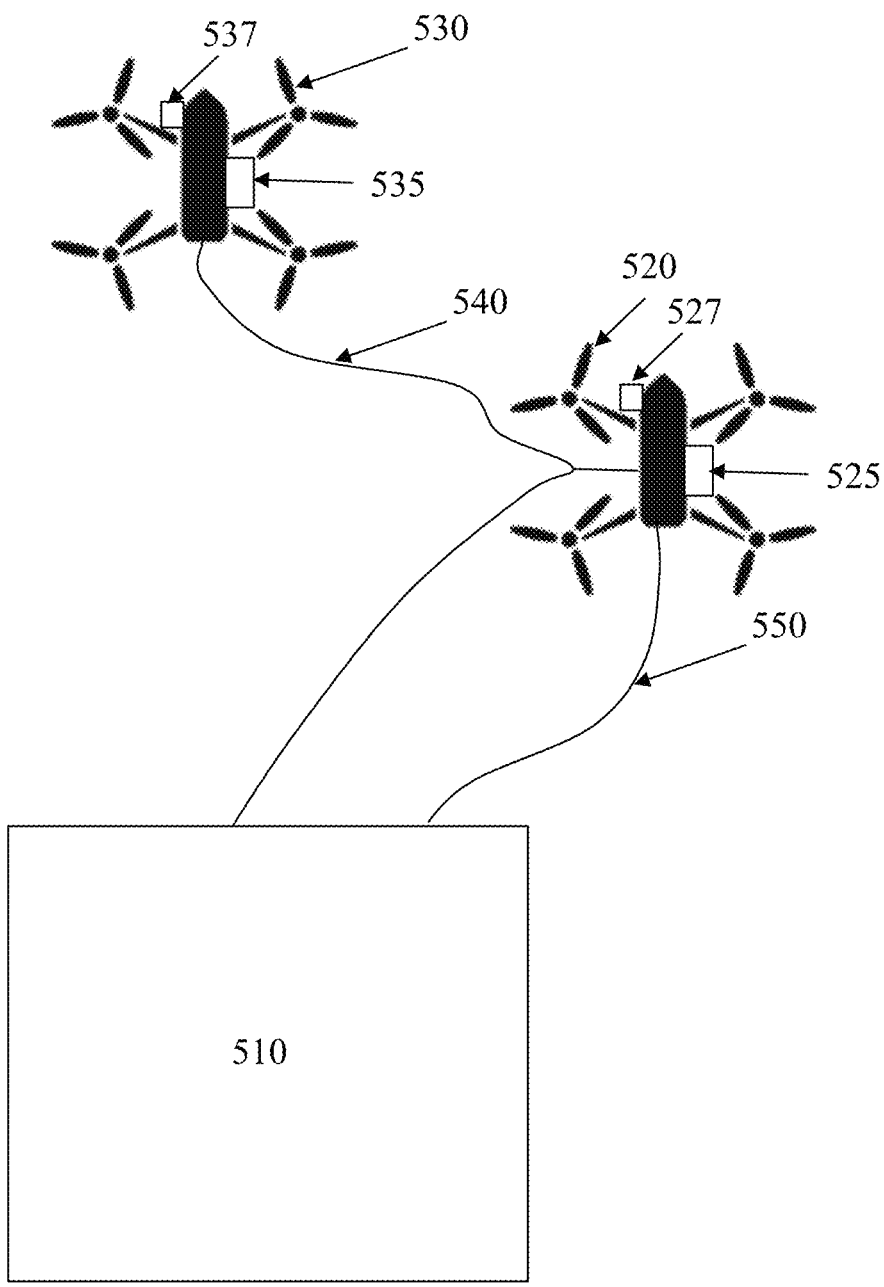
FIG. 1A is a block diagram of an exemplary embodiment of a system 500.

FIG. 1A is a block diagram of an exemplary embodiment of a system 500, which comprises a drone tethering system 510, a support drone 520, a working drone 530, a first insulated cable 540 and a second insulated cable 550. Working drone 530 comprises a first wireless transceiver 535. Support drone 520 comprises a second wireless transceiver 525.

First insulated cable 540 is constructed to provide electrical energy to working drone 530. Second insulated cable 550 is constructed to provide electrical energy to support drone 520.

In certain exemplary embodiments:
first wireless transceiver 535 communicates via Bluetooth;
first wireless transceiver 535 controls picking up an article; and/or
first wireless transceiver 535 controls delivering an article.

In certain exemplary embodiments, support drone 520 can comprise a radar subsystem 527 and/or working drone 530 can comprise a radar subsystem 537. In some embodiments, radar subsystem 527 and/or radar subsystem 537 can sense mobile or stationary objects in proximity to support drone 520 and working drone 530. In other embodiments, radar subsystem 527 and/or radar subsystem 537 can receive information concerning mobile or stationary objects in proximity to support drone 520 and working drone 530 from radar sensors that are remote from either drone.

Figure 1B:
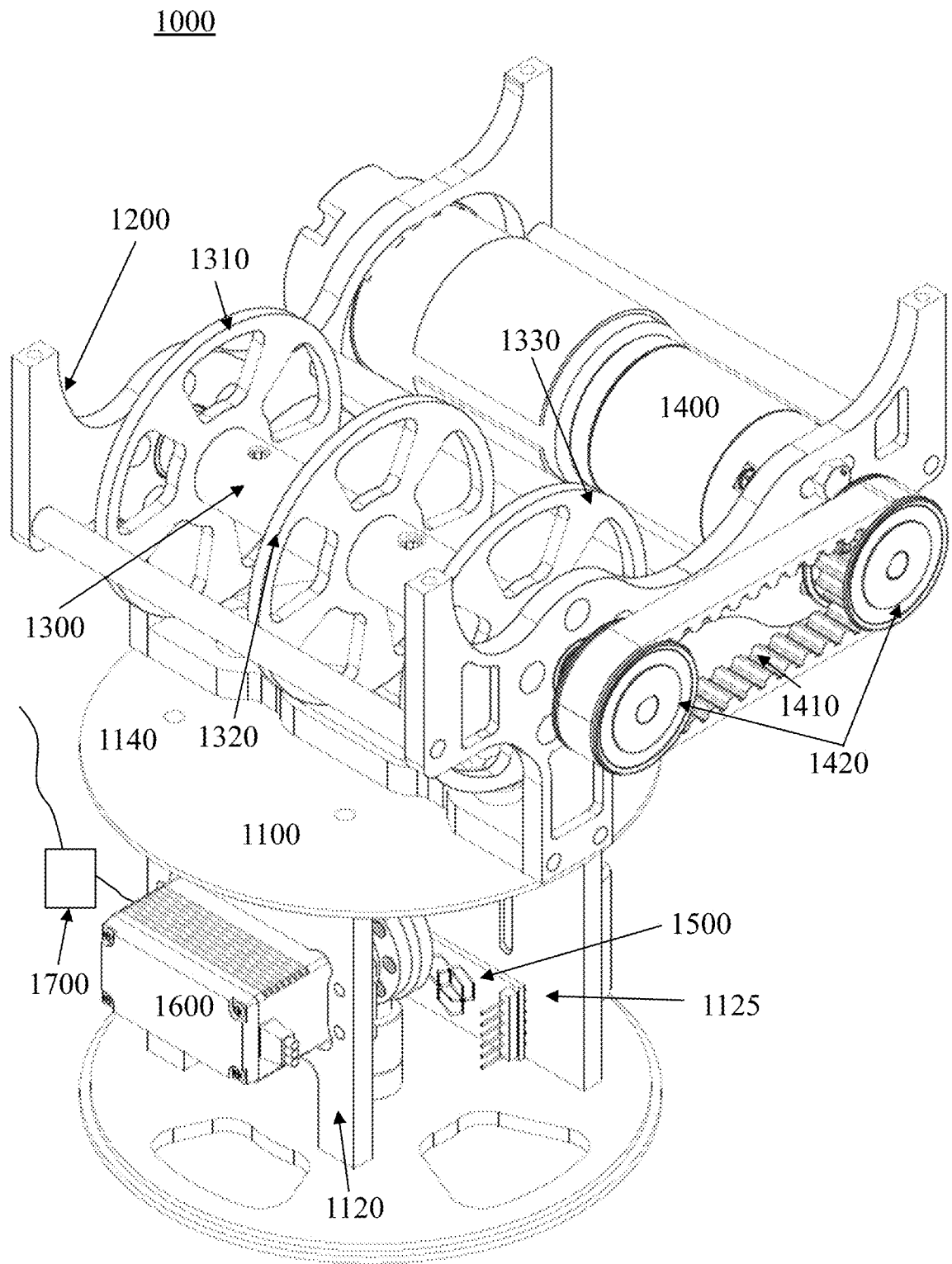
FIG. 1B is a perspective view of an exemplary embodiment of a system 1000.

FIG. 1B is a perspective view of an exemplary embodiment of a system 1000, which comprises a frame 1100, a spool support 1200 coupled to frame 1100, a spool 1300 coupled to spool support 1200; a reversible drive 1400 coupled to spool 1300, a control circuit 1500 coupled to frame 1100, a power supply 1600 coupled to frame 1100, and a power source electrically coupled to power supply 1600.

Control circuit 1500 is constructed to cause reversible drive 1400 to extend or retract the pair of insulted cables (see, e.g., first insulated cable 540 and second insulated cable 550 of FIG. 1) responsive to motion of a working drone (see, e.g., working drone 530 of FIG. 1) communicated via the first wireless transceiver (see, e.g., first wireless transceiver 535 of FIG. 1). Control circuit 1500 constructed to cause a support drone (see, e.g., support drone 520 of FIG. 1) to control travel of the working drone (see, e.g., working drone 530 of FIG. 1) via a wireless signal.

Spool 1300 is constructed to be coupled to a pair of insulated cables (see, e.g., first insulated cable 540 and second insulated cable 550 of FIG. 1). Spool 1300 comprises three rims, first rim 1310, second rim 1320, and third rim 1330. Each of the three rims (first rim 1310, second rim 1320, and third rim 1330) constructed to restrain motion of one of the pair of insulated cables (see, e.g., first insulated cable 540 and second insulated cable 550 of FIG. 1) to within a predetermined portion of Spool 1300. Spool 1300 defining a plurality of spool apertures (see, e.g., plurality of apertures 1340 of FIG. 2). Each of the plurality of spool apertures (see, e.g., plurality of apertures 1340 of FIG. 2) is constructed to be fixedly coupled to one of the pair of insulated cables (see, e.g., first insulated cable 540 and second insulated cable 550 of FIG. 1).

In certain exemplary embodiments, reversible drive 1400 can be coupled to spool 1300 via a cogged belt 1410 and a pair of sheaves 1420. In other exemplary embodiments, reversible drive 1400 can be coupled to spool 1300 via a chain and a pair of sprockets. In other embodiments, reversible drive 1400 can be direct coupled to spool 1300 or coupled via gears. Reversible drive 1400 constructed to cause extension and retraction of the pair of insulated cables (see, e.g., first insulated cable 540 and second insulated cable 550 of FIG. 1). The working drone (see, e.g., working drone 530 of FIG. 1) is tethered to a first cable of the pair of insulted cables (see, e.g., first insulated cable 540 of FIG.

1) and a support drone is tethered to a second cable of the pair of insulted cables (see, e.g., second insulated cable 550 of FIG. 1).

Control circuit 1500 can cause:
the pair of insulated cables (see, e.g., first insulated cable 540 and second insulated cable 550 of FIG. 1) to extend or retract based upon a sensed tension of at least one of the pair of insulated cables;
the pair of insulated cables (see, e.g., first insulated cable 540 and second insulated cable 550 of FIG. 1) to extend or retract based upon a Global Positioning System signal from at least one of the working drone and the support drone; and/or the pair of insulated cables to extend or retract based upon a wide area augmentation system signal from at least one of the working drone and the support drone.

Power supply 1600 is electrically and/or communicatively coupled to both reversible drive 1400 and control circuit 1500. Power source 1700 is electrically coupled to power supply 1600. Power source 1700 can obtain electrical energy from wired electrical energy sources and/or from batteries. Frame 1100 coupled to a portion of power supply 1600. In certain exemplary embodiments, a portion of power supply 1600 passes through a first support plate 1120 of frame 1100.

Frame 1100 can comprise:
base 1105, wherein base 1105 defines a plurality of base apertures 1110 (shown on FIG. 10); each of the plurality of base apertures 1110 are constructed to releasably couple frame 1100 to first support plate 1120 and second support plate 1125; base 1105 also defines a plurality of cooling apertures 1130, wherein each of plurality of cooling apertures 1130 is constructed to dissipate heat from power supply 1600;
a cap 1140, which is coupled to spool support 1200;
first support plate 1120, which is coupled to cap 1140, power supply 1600 coupled to first support plate 1120; and
second support plate 1125, which coupled to cap 1140, control circuit 1500 coupled to second support plate 1125.

Figure 2:
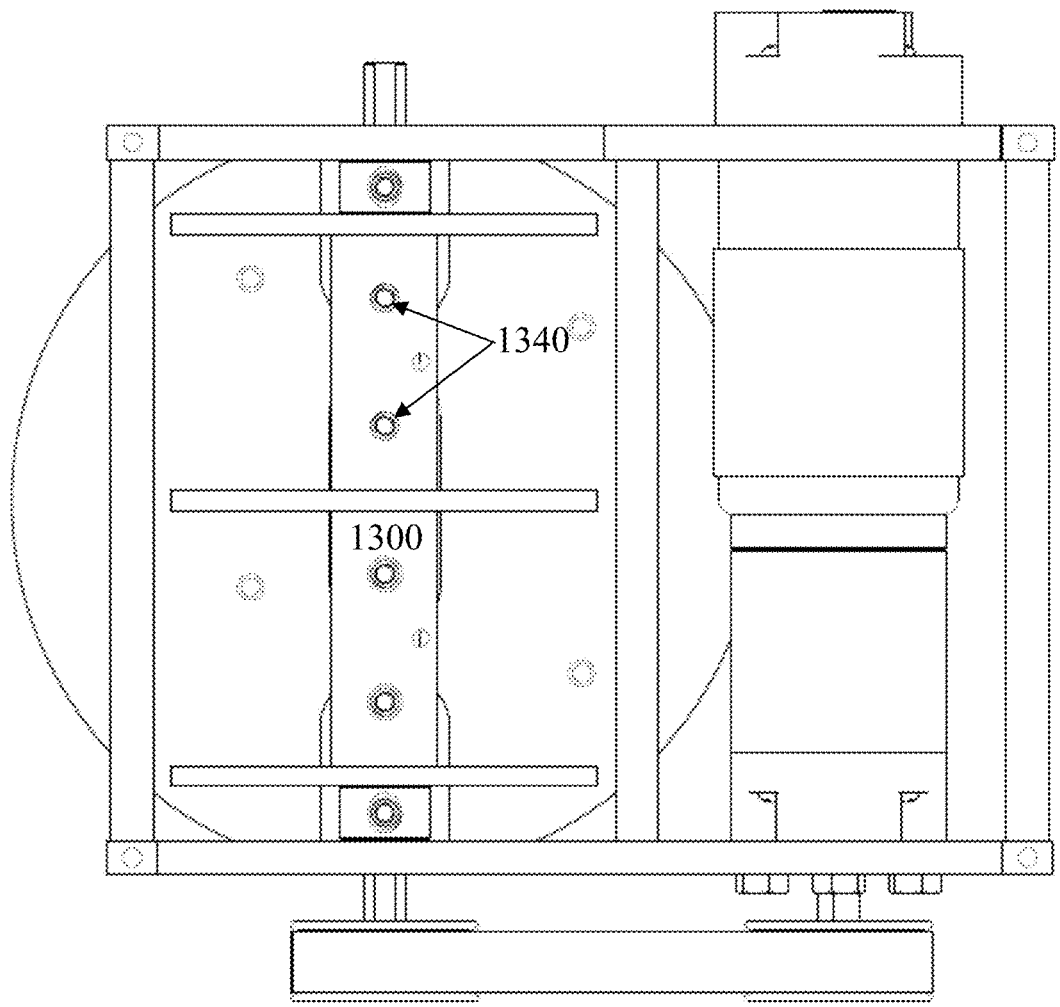
FIG. 2 is a plan view of system 1000.

FIG. 2 is a plan view of system 1000, which shows plurality of apertures 1340 defined by spool 1300.

Figure 3:
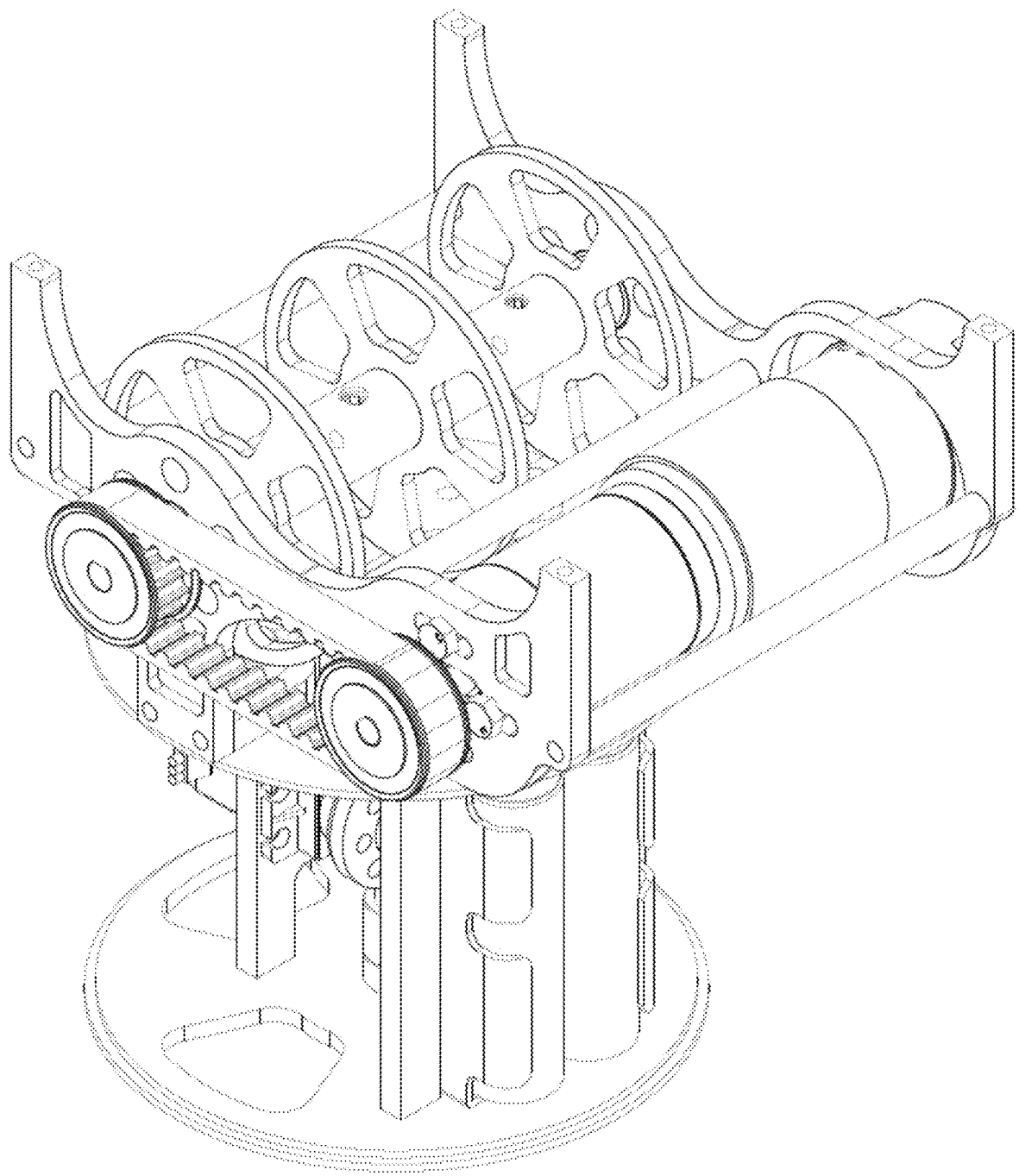
FIG. 3 is a perspective view of system 1000.
Figure 4:
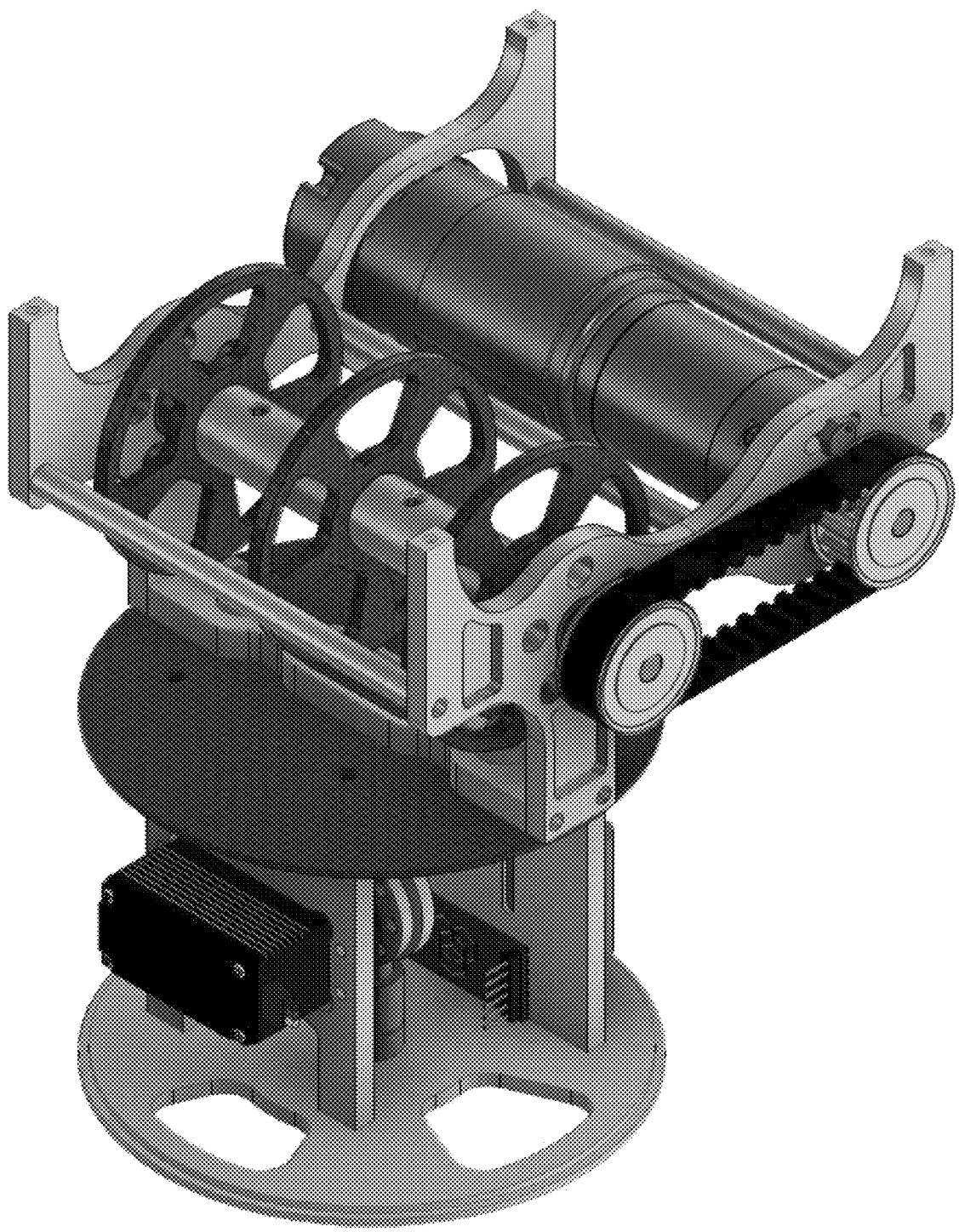
FIG. 4 is a perspective view of system 1000.
Figure 5:
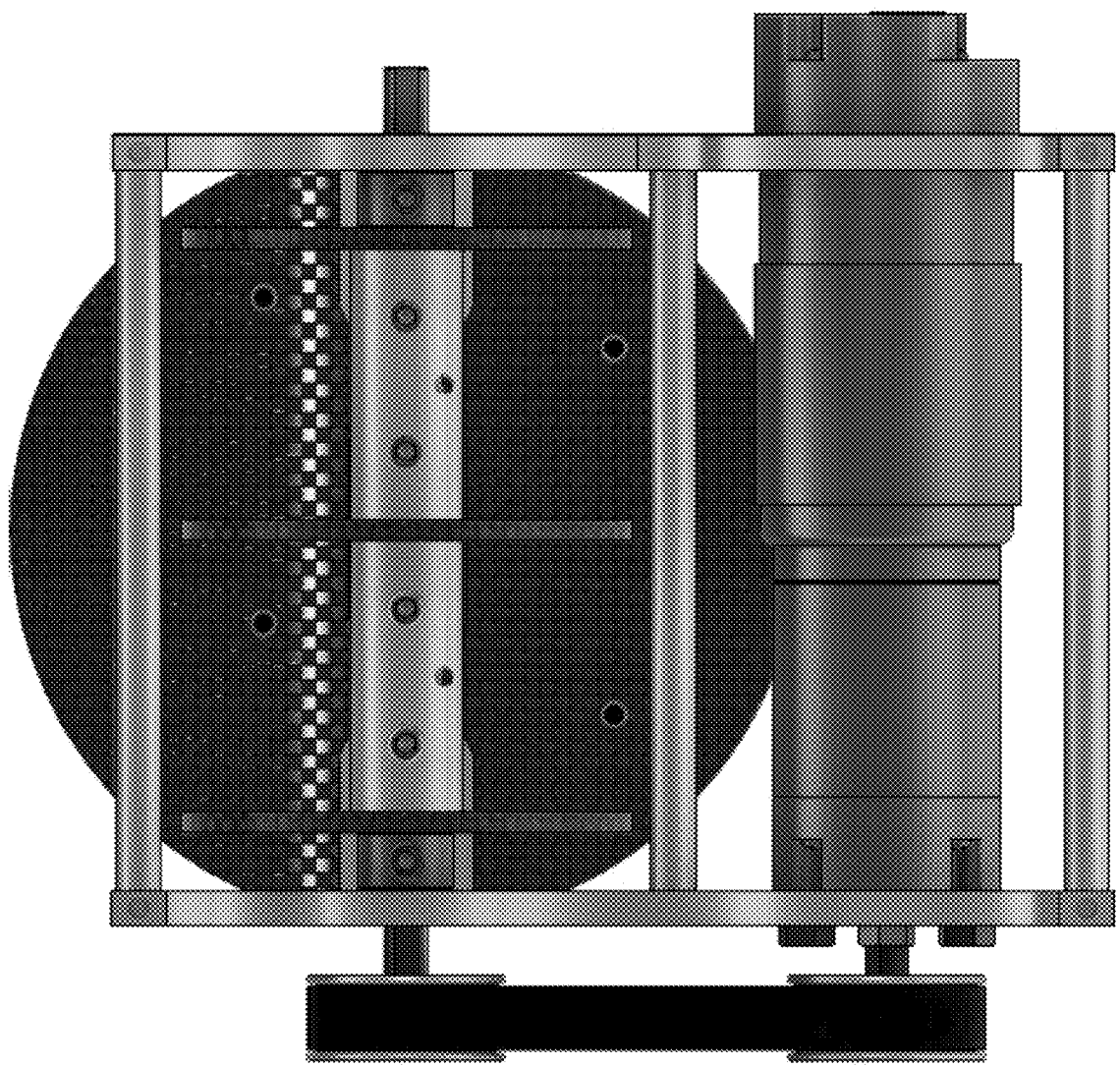
FIG. 5 is a plan view of system 1000.
Figure 6:
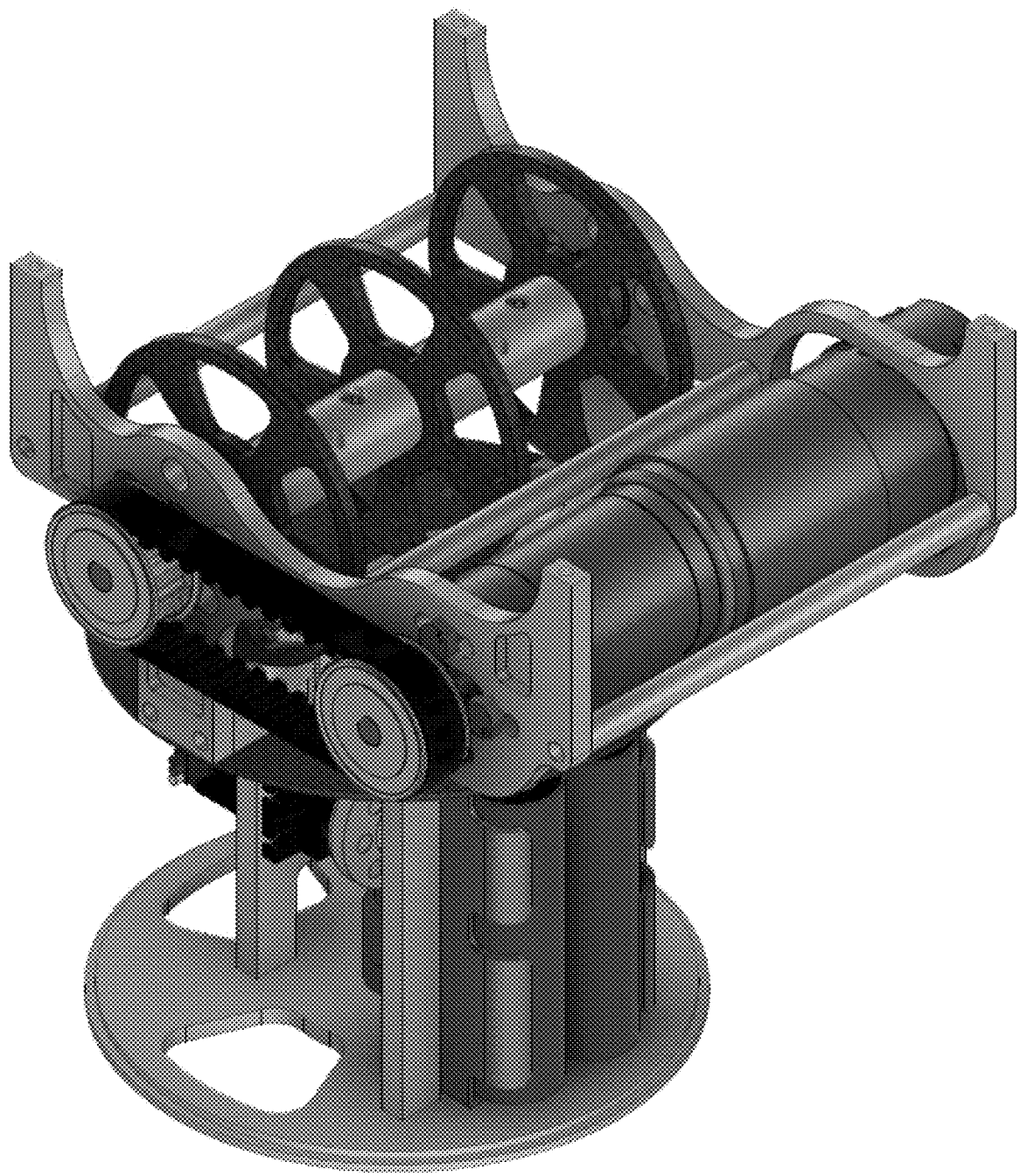
FIG. 6 is a perspective view of system 1000.
Figure 7:
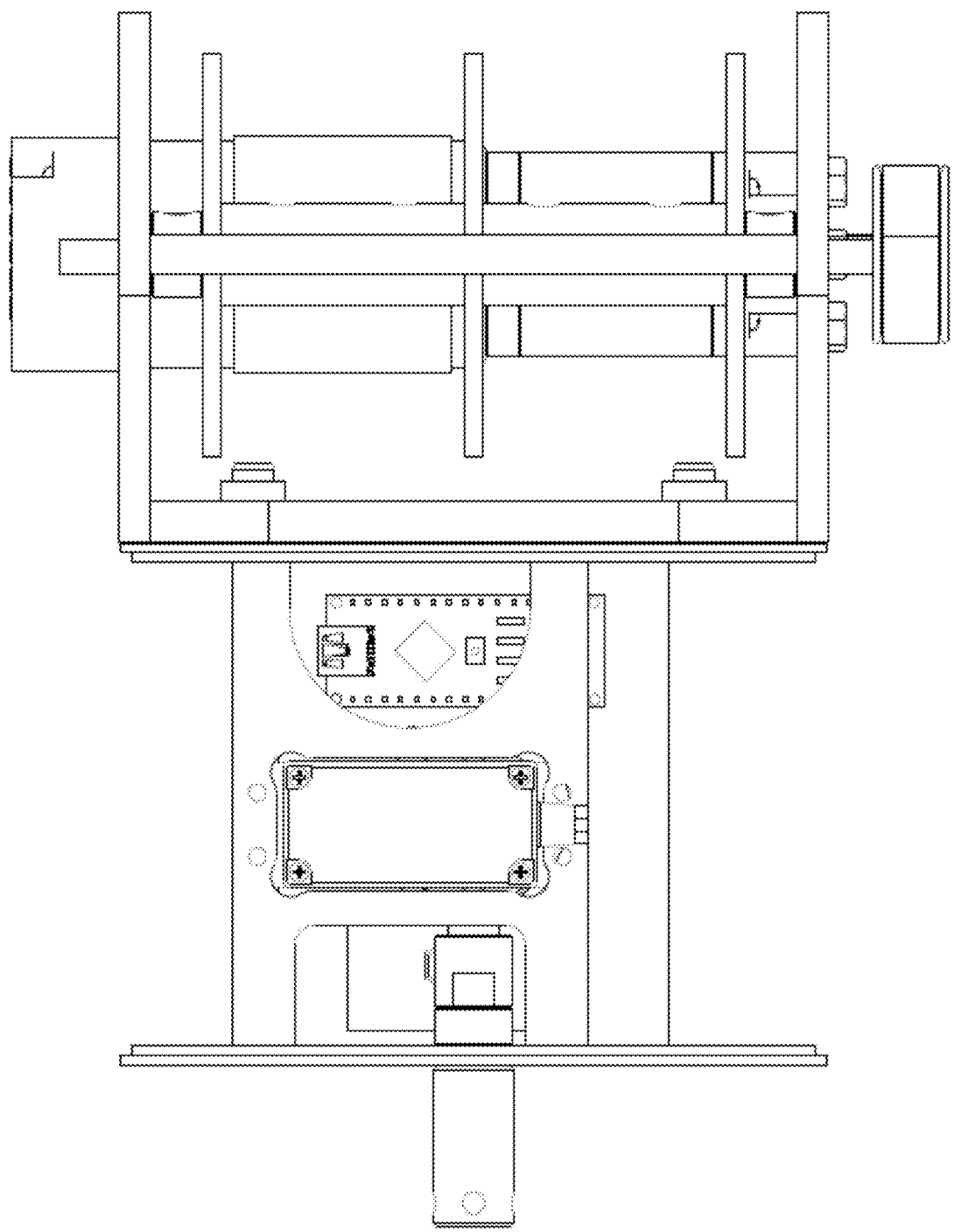
FIG. 7 is a side view of system 1000.
Figure 8:
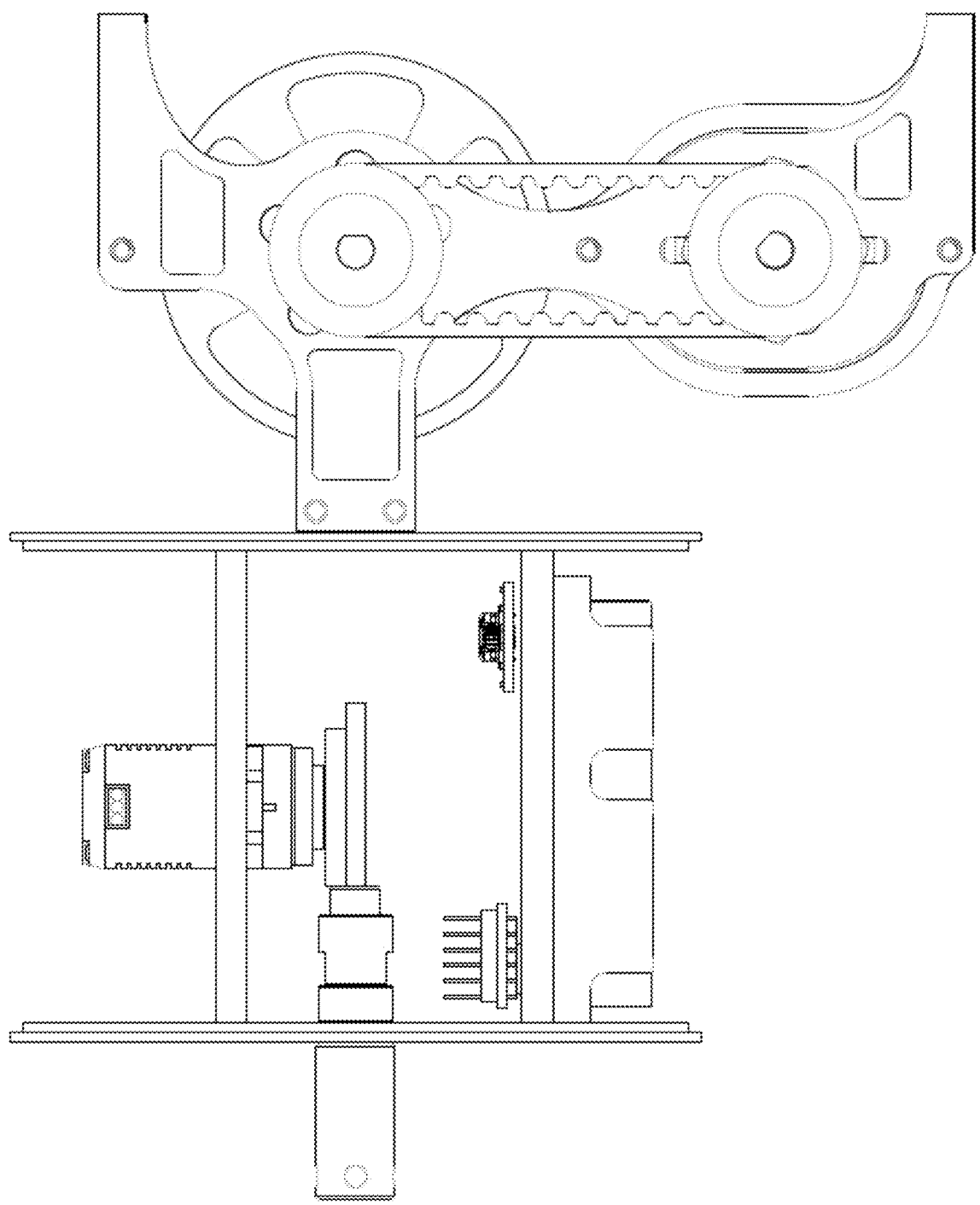
FIG. 8 is a sectional view of system 1000.
Figure 9:
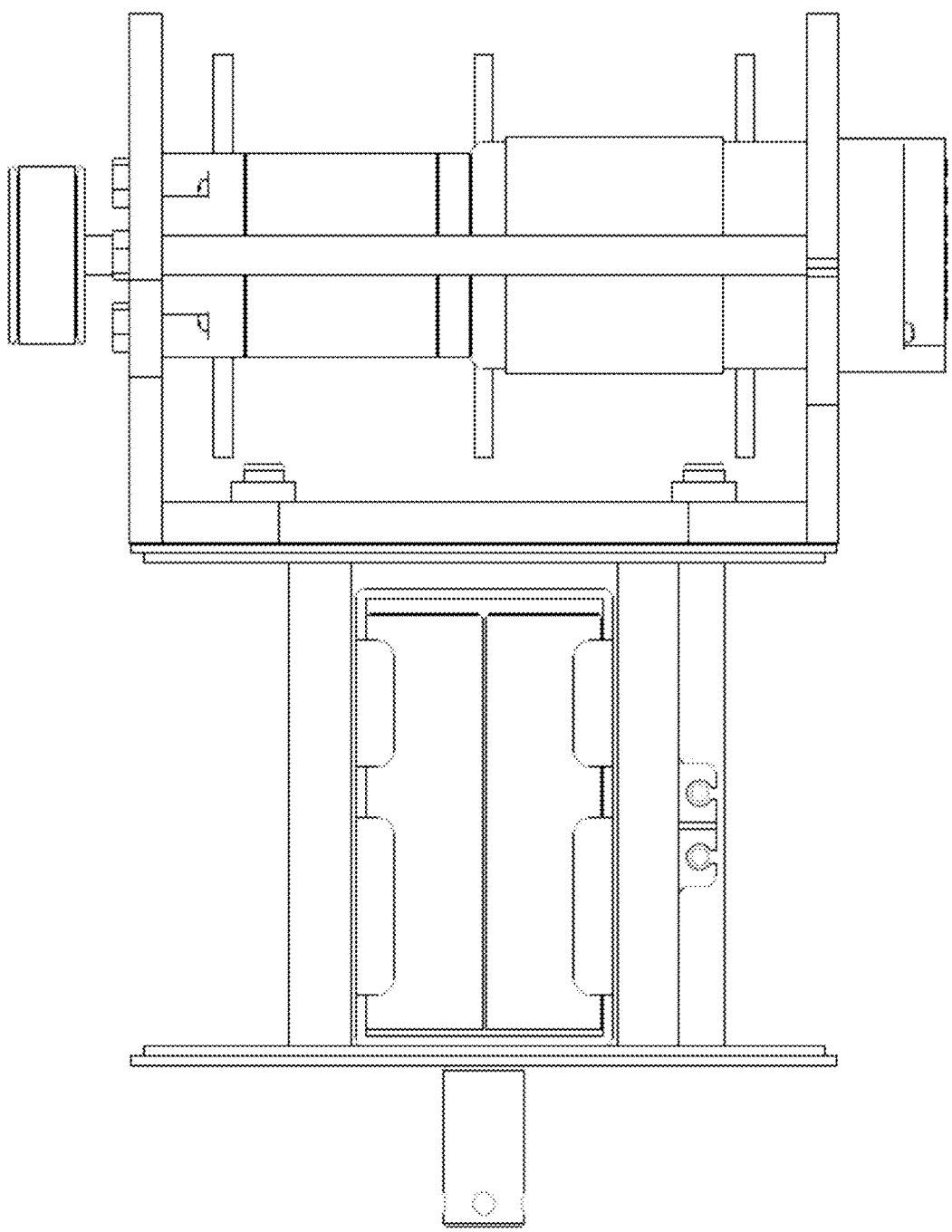
FIG. 9 is an end view of system 1000.
Figure 10:
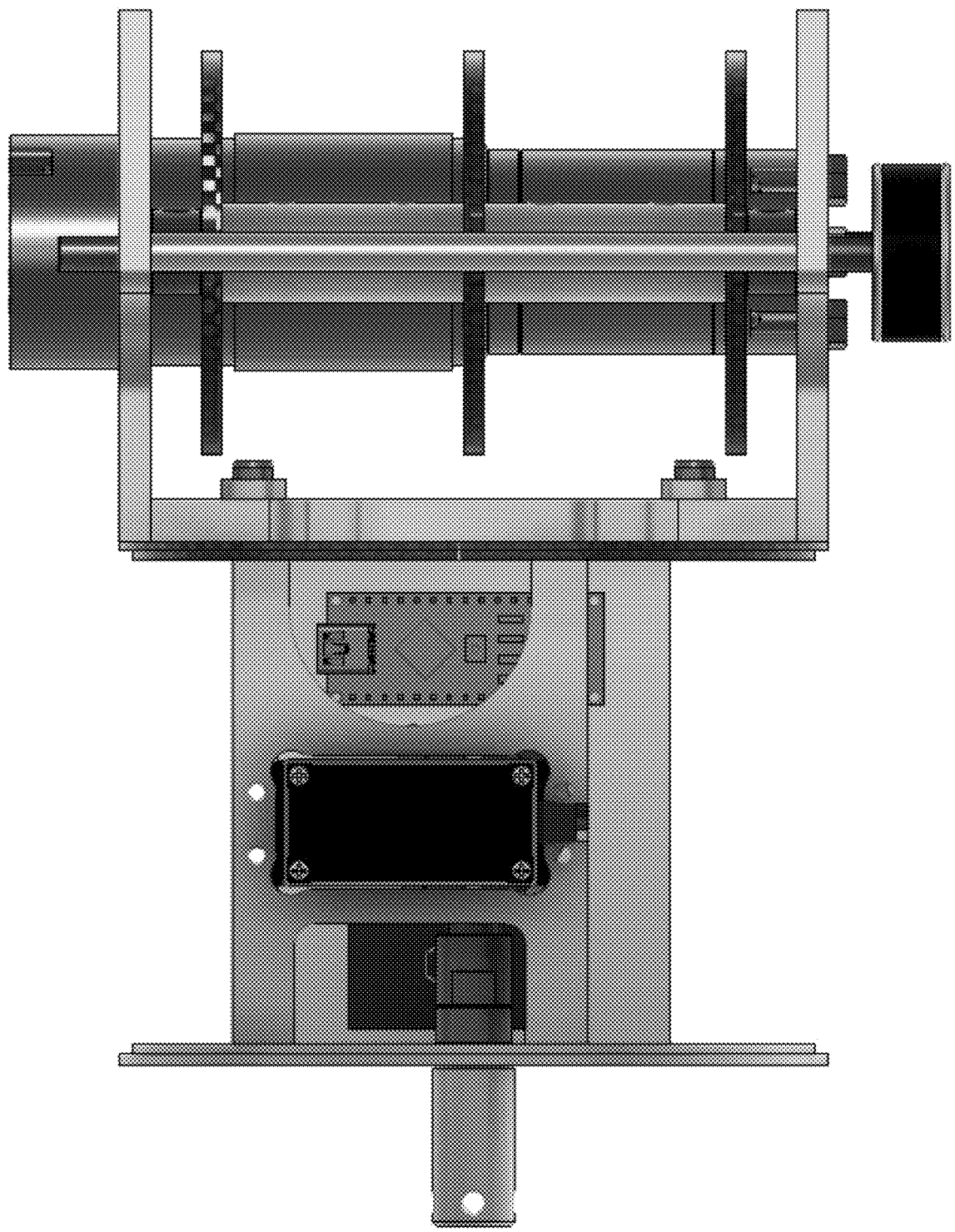
FIG. 10 is a side view system 1000.
Figure 11:
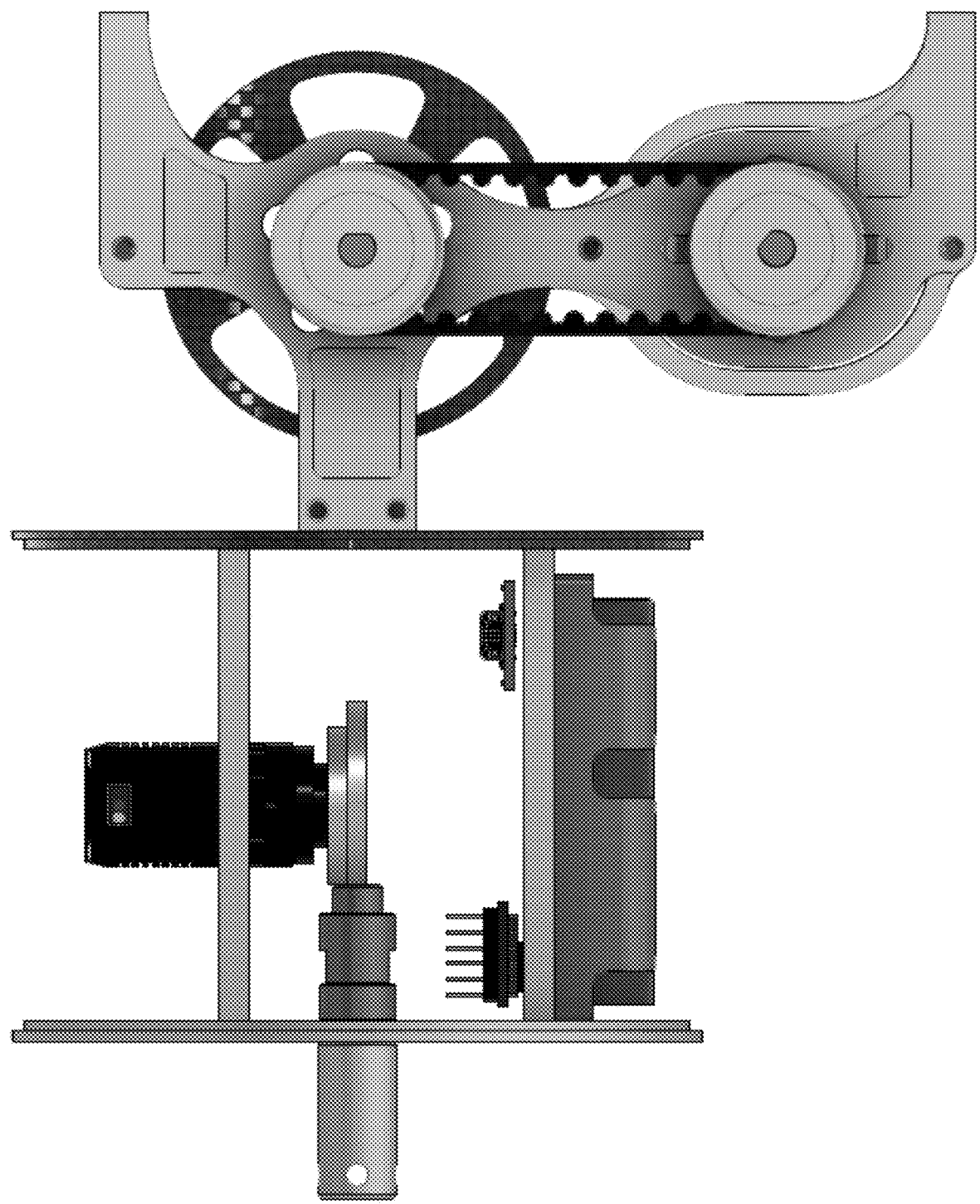
FIG. 11 is a sectional view of system 1000.
Figure 12:
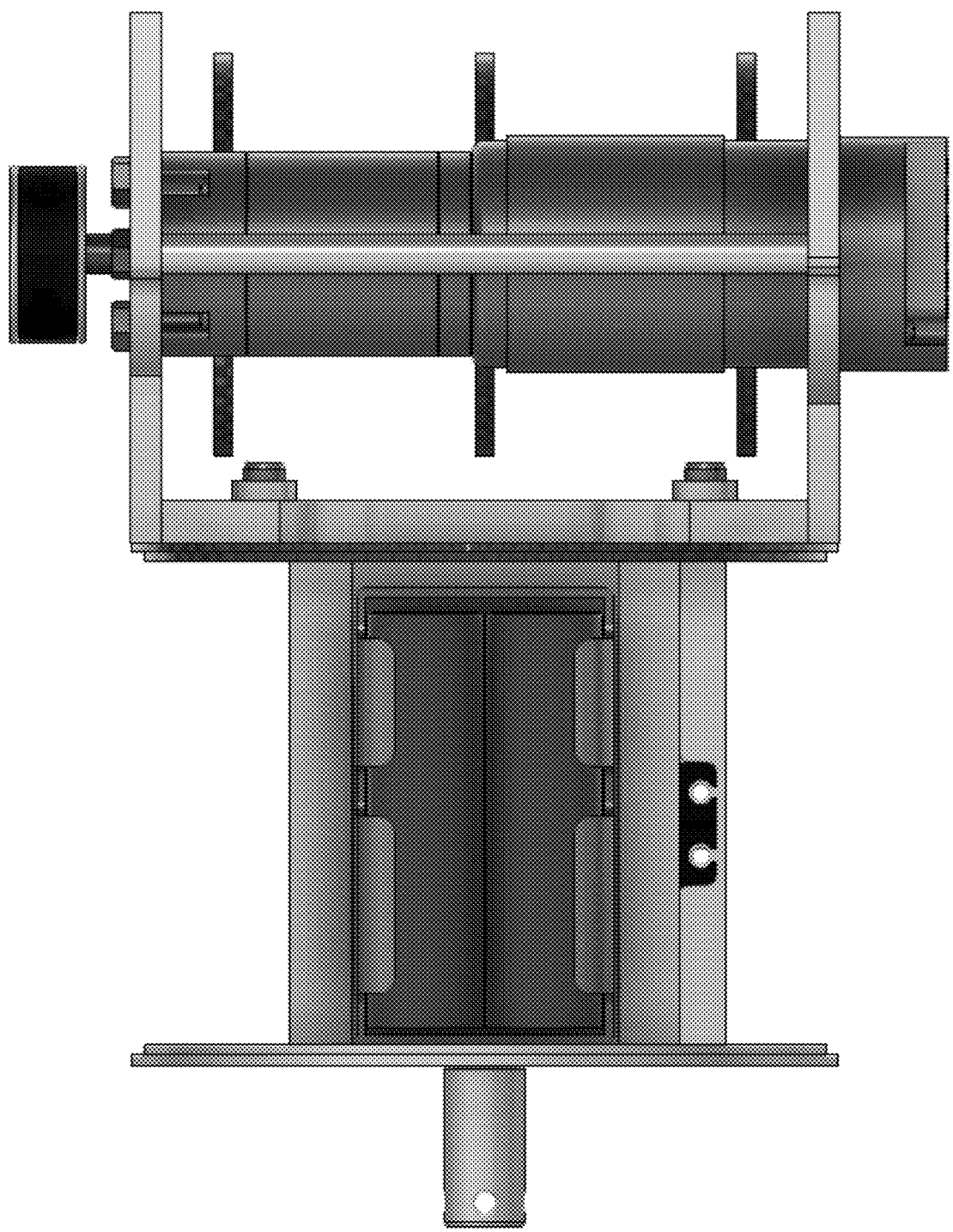
FIG. 12 is an end view of system 1000.
Figure 13:
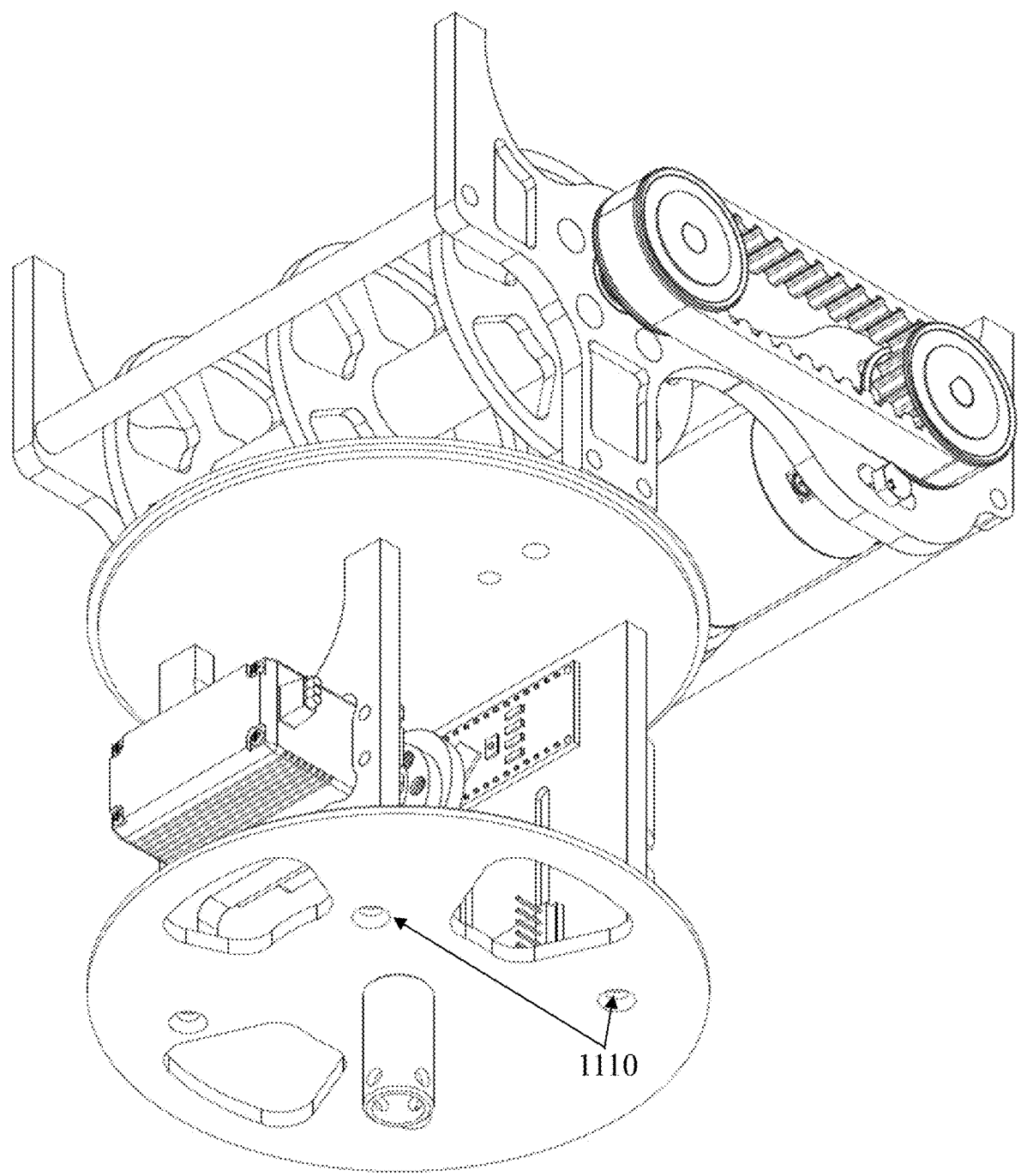
FIG. 13 is a perspective view of system 1000.
Figure 14:
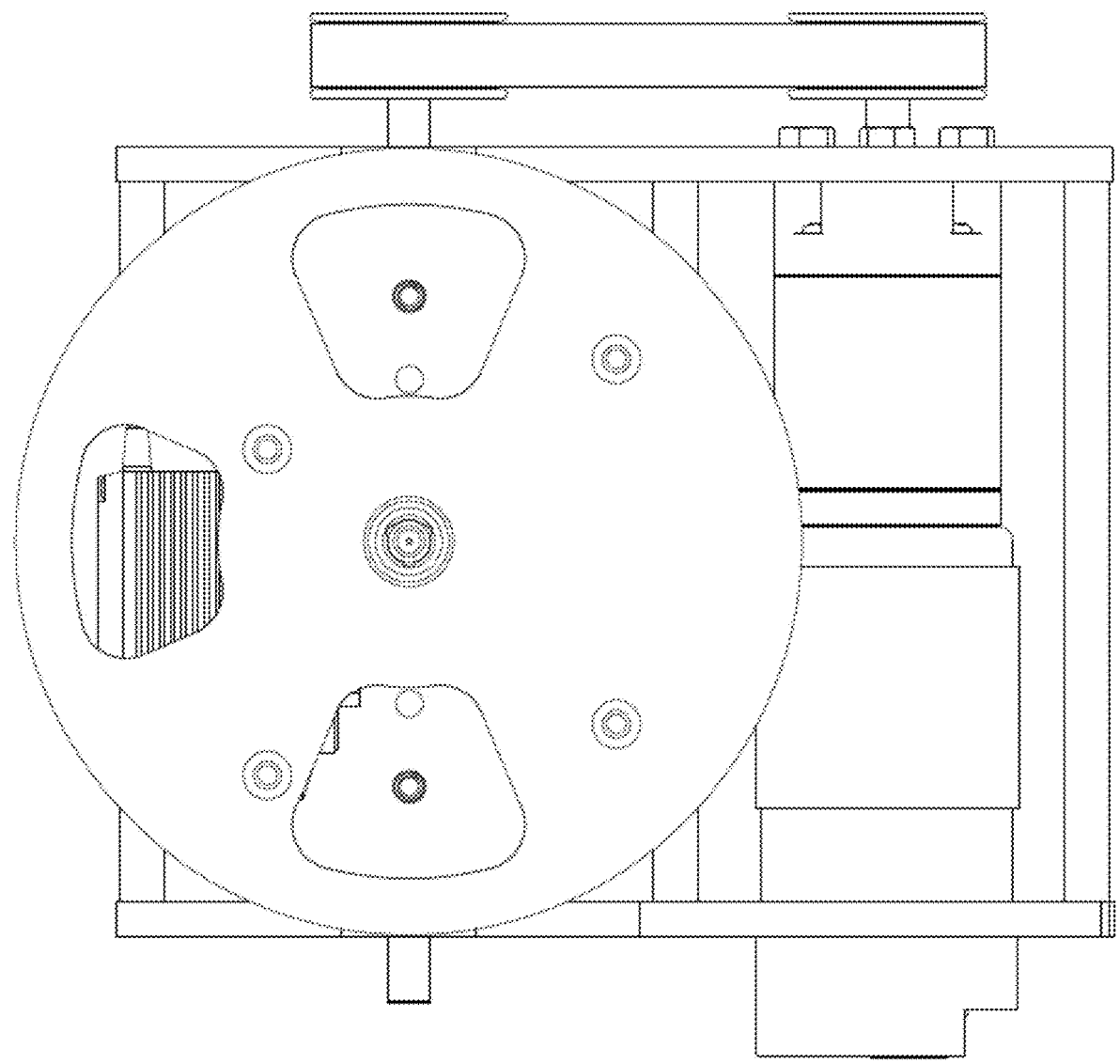
FIG. 14 is a bottom view of system 1000.
Figure 15:
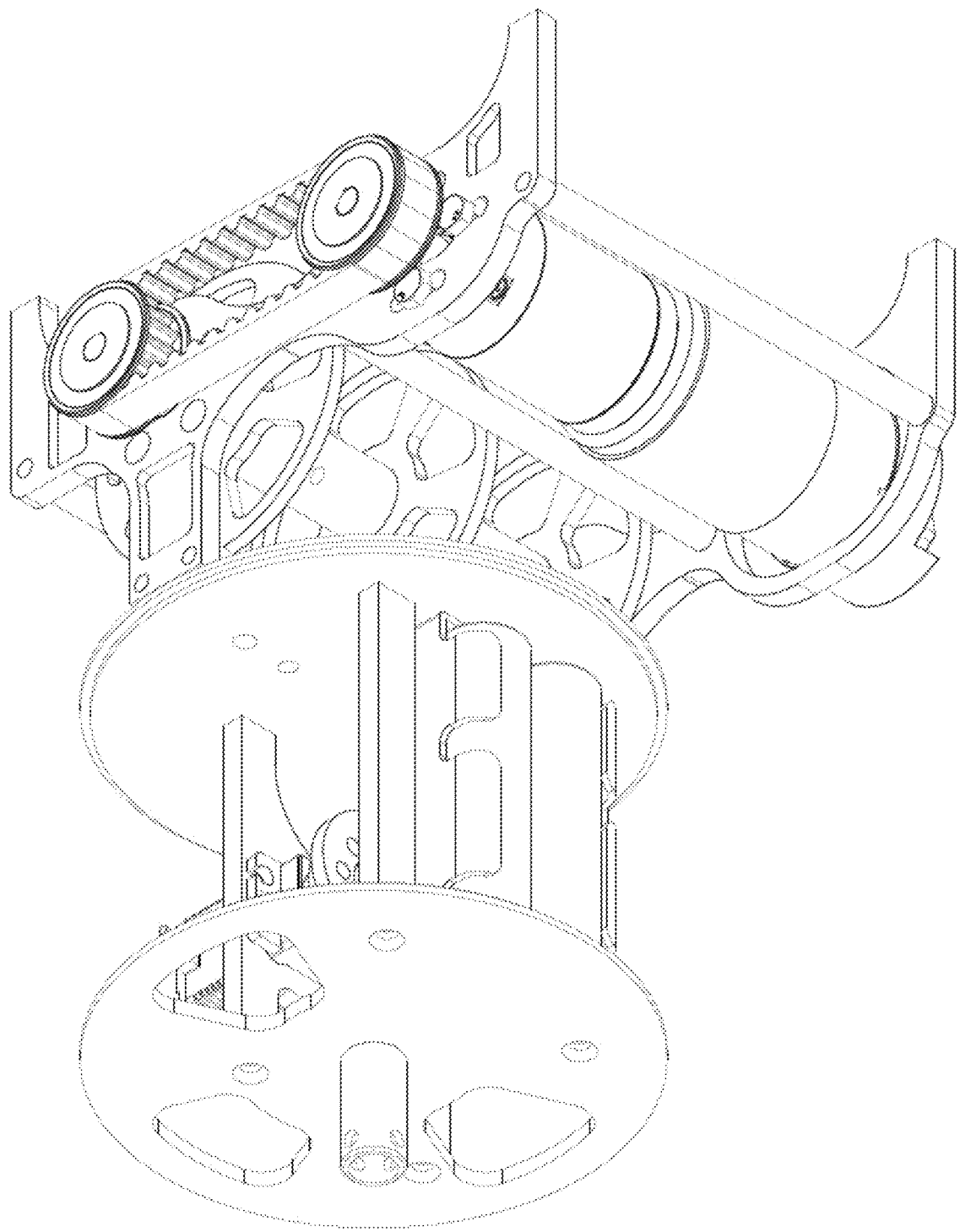
FIG. 15 is a perspective view of system 1000.
Figure 16:
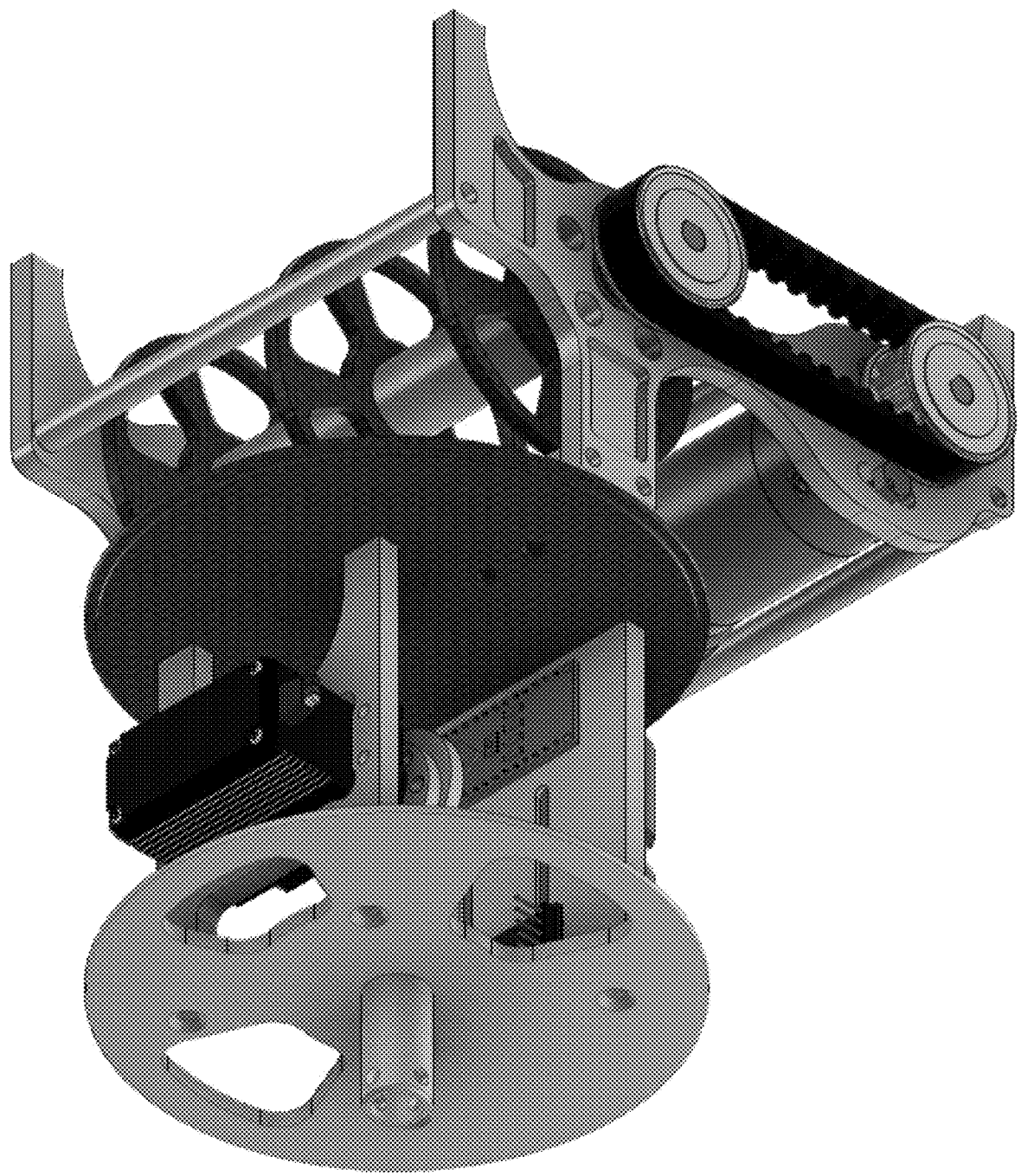
FIG. 16 is a perspective view of system 1000.
Figure 17:
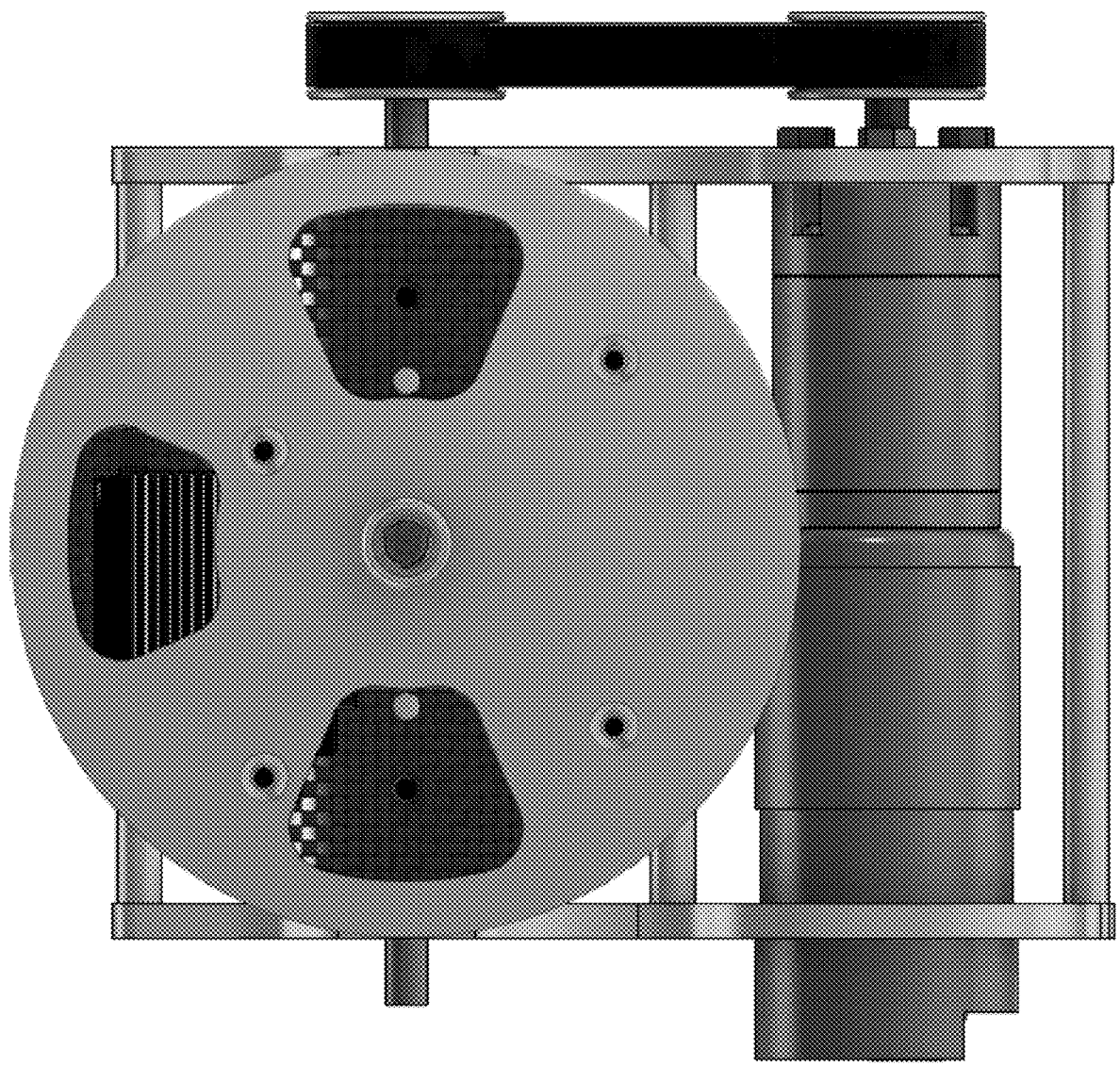
FIG. 17 is a bottom view of system 1000.
Figure 18:
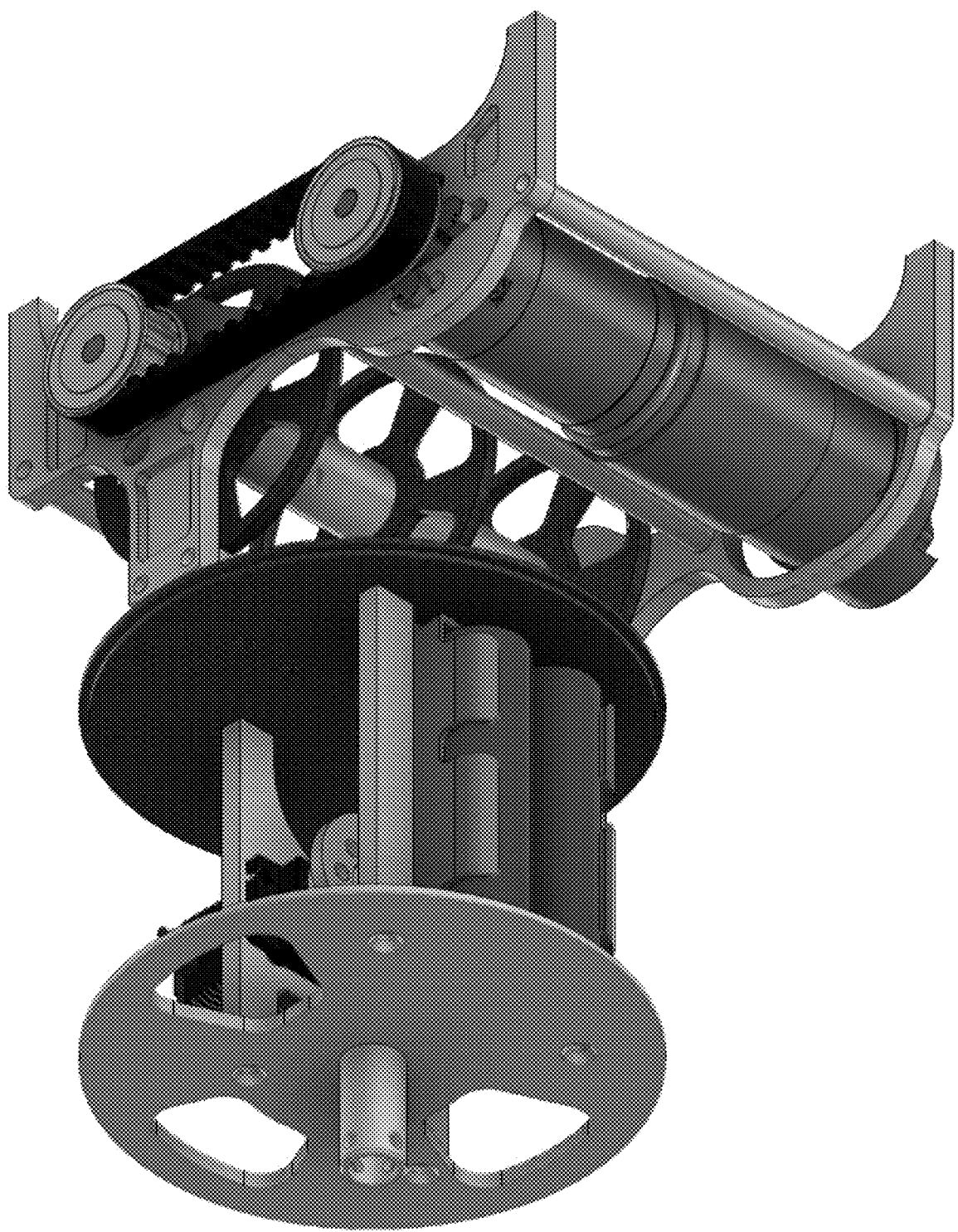
FIG. 18 is a perspective view of system 1000.
Figures 19, 19A:
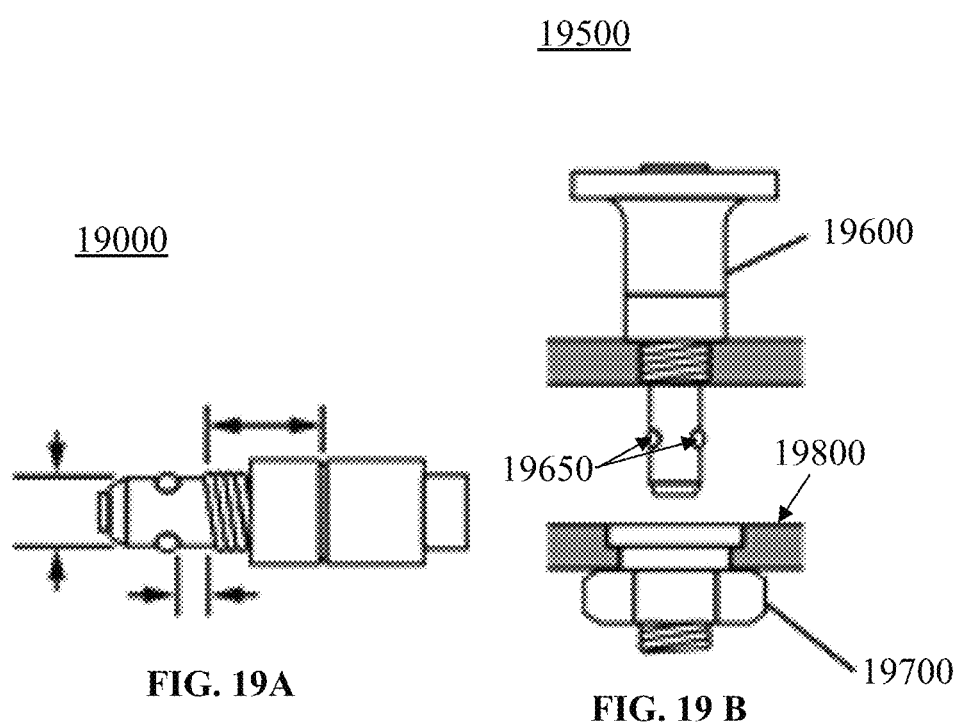
FIG. 19A is a plan view of an exemplary embodiment of a system 19000.

FIG. 3 is a perspective view of system 1000.
FIG. 4 is a perspective view of system 1000.
FIG. 5 is a plan view of system 1000.
FIG. 6 is a perspective view of system 1000.
FIG. 7 is a side view of system 1000.
FIG. 8 is a sectional view of system 1000.
FIG. 9 is an end view of system 1000.
FIG. 10 is a side view system 1000.
FIG. 11 is a sectional view of system 1000.
FIG. 12 is an end view of system 1000.
FIG. 13 is a perspective view of system 1000.
FIG. 14 is a bottom view of system 1000.
FIG. 15 is a perspective view of system 1000.
FIG. 16 is a perspective view of system 1000.
FIG. 17 is a bottom view of system 1000.
FIG. 18 is a perspective view of system 1000.
FIG. 19A is a plan view of an exemplary embodiment of a system 19000.
FIG. 19B is a side view of an exemplary embodiment of a system 19500, which comprises a stem 19600 and a receptacle 19700. Stem 19600 comprises a plurality of compressible components 19650. In certain operative embodiments, stem 19600 is coupled to a working drone (see, e.g., working drone 530 of FIG. 1). Receptacle 19700 can be coupled to a box 19800 to which the working drone (see, e.g., working drone 530 of FIG. 1) delivers articles. Stem 19600 is constructed to engage with receptacle 19700 to releasably couple the working drone (see, e.g., working drone 530 of FIG. 1) to box 19800.

Figure 20:
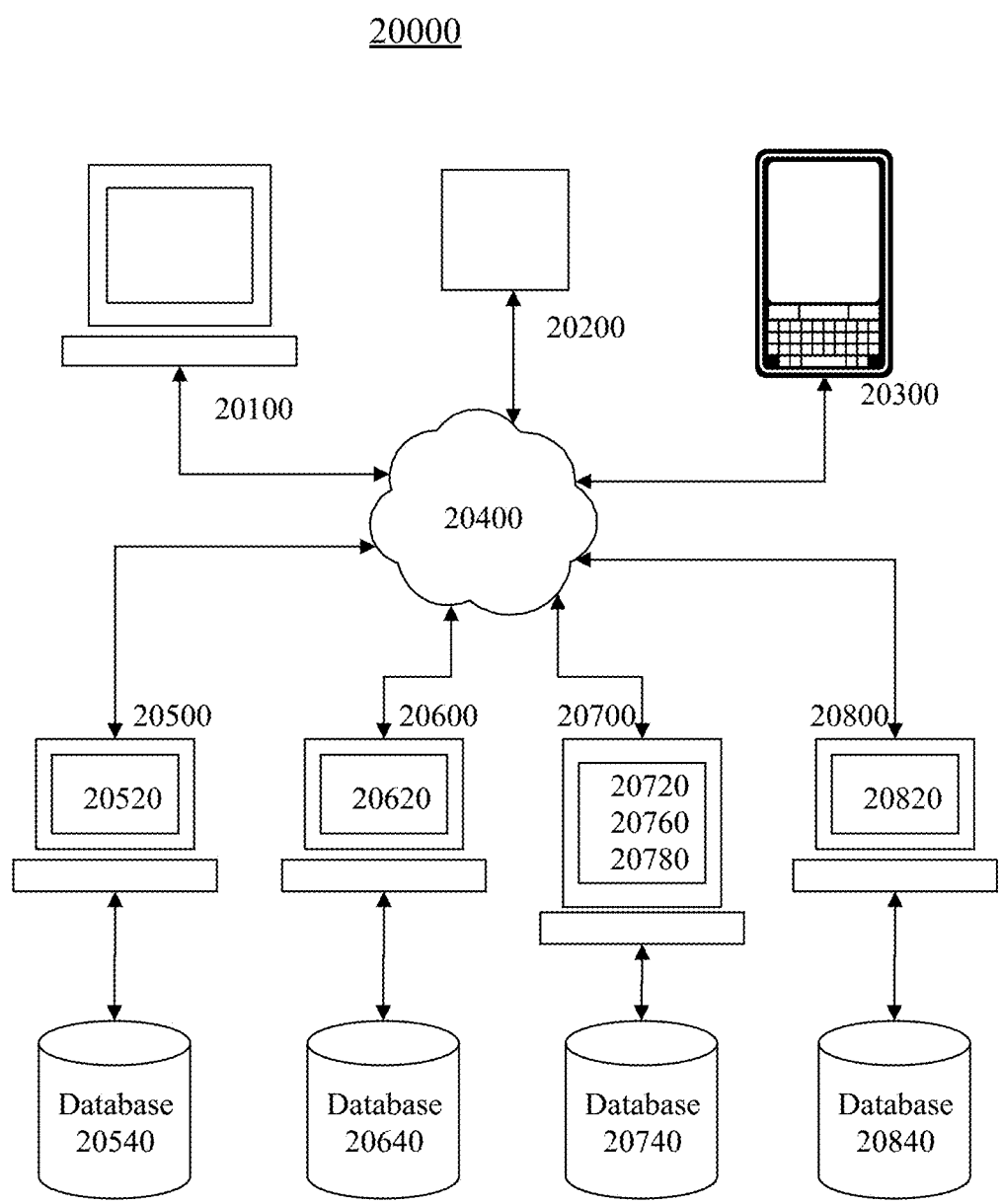
FIG. 20 is a block diagram of an exemplary embodiment of a system 20000.
Figure 21:
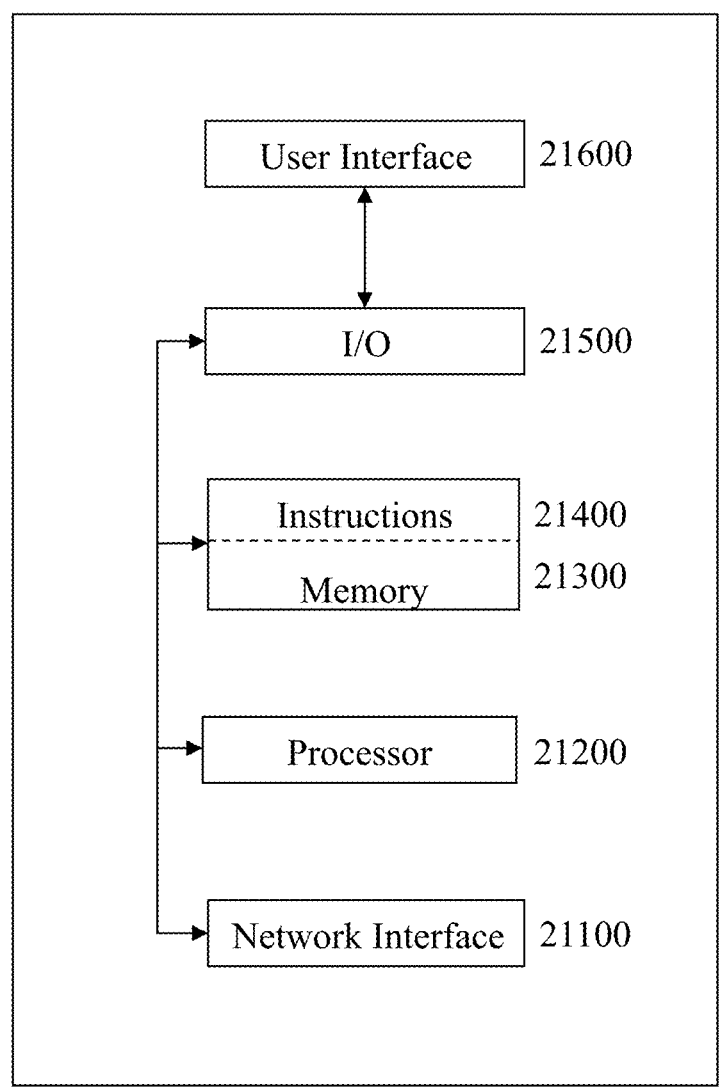
FIG. 21 is a block diagram of an exemplary embodiment of an information device 21000.

FIG. 20 is a block diagram of an exemplary embodiment of a system 20000, which can comprise a smartphone 20300, an information device 20100, tablet 20200, a network 20400, a first server 20500, a second server 20600, a third server 20700, and a fourth server 20800. First server 20500 can comprise a first user interface 20520 and can be coupled to a first database 20540. Second server 20600 can comprise a second user interface 20620 and can be coupled to a second database 20640. Third server 20700 can comprise a third user interface 20720, a processor 20760, machine instructions 20780, and can be coupled to a third database 20740. Fourth server 20800 can comprise a fourth user interface 20820 and can be coupled to a fourth database 20840. Any of the methods and/or steps thereof can be carried out in whole or in part by tablet 20200, smartphone 20300, information device 20100 and/or first server 20500. Second server 20600, third server 20700, and/or fourth server 20800 can each be associated with implementation of a system via which rides are provided to customers. In certain exemplary embodiments, system 20000 can be used to implement one or more methods disclosed herein FIG. 21 is a block diagram of an exemplary embodiment of an information device 21000, which in certain operative embodiments can comprise, for example, information device 20100, tablet 20200, first server 20500, second server 20600, third server 20700, and/or fourth server 20800 of FIG. 20. Information device 21000 can comprise any of numerous circuits and/or components, such as for example, one or more network interfaces 21100, one or more processors 210200, one or more memories 21300 containing instructions 21400, one or more input/output (I/O) devices 21500, and/or one or more user interfaces 21600 coupled to I/O device 21500, etc.

Figure 22:
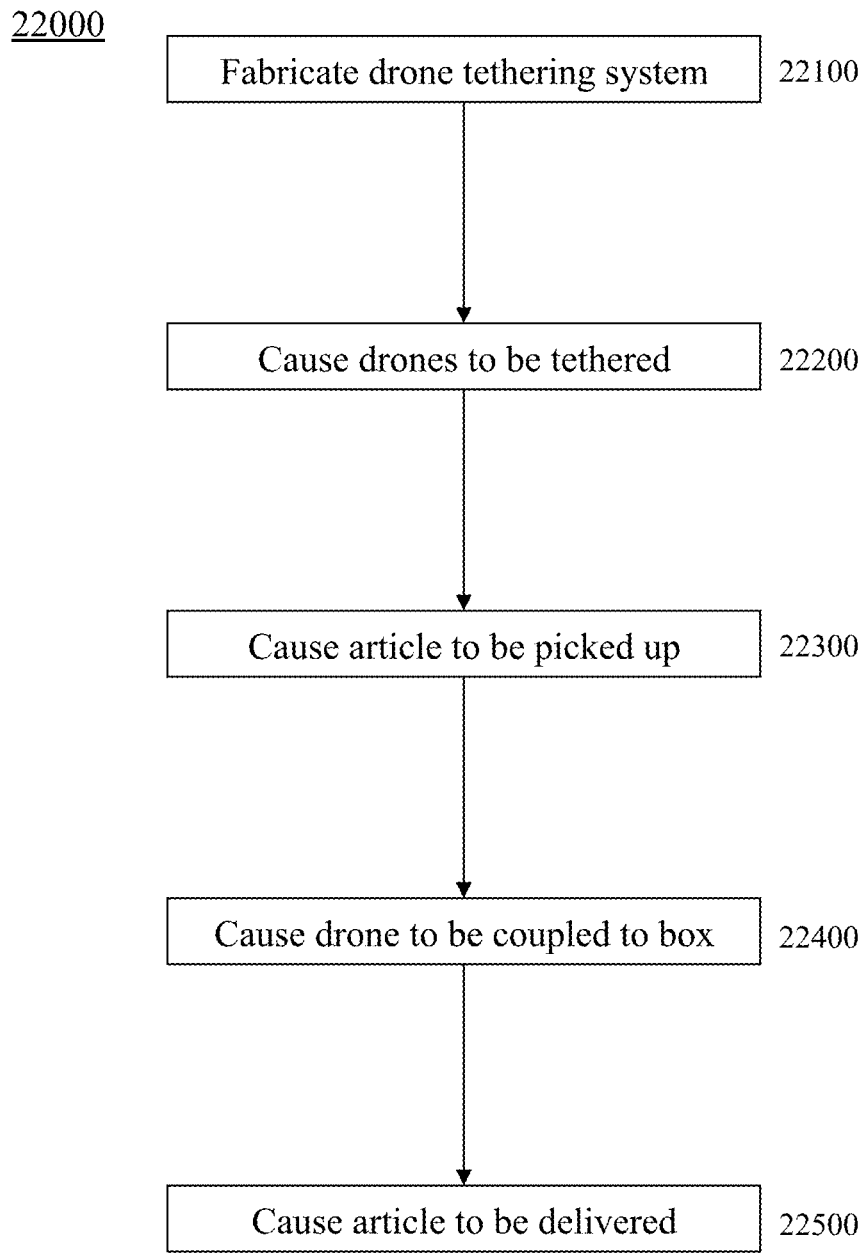
FIG. 22 is a flowchart of an exemplary embodiment of a method 22000.

FIG. 22 is a flowchart of an exemplary embodiment of a method 22000. At activity 22100, a drone tethering system is fabricated.

At activity 22200, certain exemplary embodiments cause a working drone and a support drone to be tethered to the drone tethering system. The working drone and a support drone are tethered via a pair of insulated cables (see, e.g., first insulated cable 540 and second insulated cable 550 of FIG. 1). In certain exemplary embodiments, the pair of insulated cables can extend or retract based upon a sensed tension of at least one of the pair of insulated cables. In other embodiments, one or both of the working drone and the support drone can be equipped with and/or in communication with a radar system that provides information to a control system of the drone tethering system. In such embodiments, a control circuit of the drone tethering system can wirelessly transmit information that causes the location of the working drone and the support drone to be changed and the pair of insulated cables to extend or retract to pick up and deliver articles.

At activity 22300, certain exemplary embodiments cause an article to be picked up via a working drone substantially without human intervention. The working drone is coupled to a support drone via a tether of the drone tethering system. The working drone is controlled via a wireless communication system that transmits signals from the support drone to the working drone. In certain exemplary embodiments, the wireless communication system can:
utilize Bluetooth;

cause an article to be picked up for delivery;
cause a box to open to receive a delivery via the working drone;
cause an article to be dropped off in the box;
cause an attachment to be picked up for coupling to a system comprising the working drone; and/or
cause an attachment to be dropped off after being decoupled from a system comprising the working drone.

At activity 22400, causing the working drone to be coupled to a box to which an article is delivered, the working drone coupled to the box via a stem coupled to the working drone and a receptacle coupled to the box, the stem comprising a plurality of compressible components.

At activity 22500, certain exemplary embodiments cause an article to be delivered via the working drone substantially without human intervention. The wireless communication system constructed to communicate with a box that receives deliveries via the drone.

In certain exemplary embodiments, via one or more user interfaces 2600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof
adapter—a device used to effect operative compatibility between different parts of one or more pieces of an apparatus or system.
and/or—either in conjunction with or in alternative to.
aperture—an opening in something.
apparatus—an appliance or device for a particular purpose.
article—a particular item or object.
associate—to join, connect together, and/or relate.
attachment—a component coupleable to a system.
automatically—acting or operating in a manner essentially independent of external influence or control. For example, an automatic light switch can turn on upon "seeing" a person in its view, without the person manually operating the light switch.
base—a supporting portion of something.
belt—a flexible band used to drive a part of a machine.
Bluetooth—a wireless technology standard for exchanging data over short distances (using short-wavelength UHF radio waves in the ISM band from 2.4 to 2.485 GHz) from fixed and mobile devices, and building personal area networks.
box—a container constructed to be coupled to, and receive deliveries from, a drone.
cable—a rope comprising metallic fibers.
can—is capable of, in at least some embodiments.
cause—to produce an effect.
circuit—an electrically conductive pathway and/or a communications connection established across two or more switching devices comprised by a network and between corresponding end systems connected to, but not comprised by the network.
cogged—comprising tooth-like projections.
communicate—to exchange information.
communication—a data transmission.
component—a part of a system.
compressible—capable of being reversibly pushed in relative to a surface.
comprising—including but not limited to.
configure—to make suitable or fit for a specific use or situation.
connect—to join or fasten together.
constructed to—made to and/or designed to.
control—to direct one or more activities.
convert—to transform, adapt, and/or change.
cool—to dissipate heat energy.
couple—to link in some fashion.
coupleable—capable of being joined, connected, and/or linked together.
create—to bring into being.
data—distinct pieces of information, usually formatted in a special or predetermined way and/or organized to express concepts.
decouple—to unlink from something.
define—to establish the outline, form, or structure of
determine—to obtain, calculate, decide, deduce, and/or ascertain.
deliver—to provide something at a predetermined location.
delivery—something provided at a predetermined location.
device—a machine, manufacture, and/or collection thereof.
dissipate—to cause to lose irreversibly. For example, transferring energy to a surrounding environment dissipates that energy.
drone—an aircraft without a human pilot on board.
drop off—to deliver via a descent from a higher elevation to a lower elevation.
electrical energy—energy characterized by the flow of electric charge through a conductor.
engage—to be in contact and interact with.
estimate—to calculate and/or determine approximately and/or tentatively.
extend—to release from a stored position such that a flexible cable stretches from the stored position.
fixedly—coupled so as to be firm and substantially not nondestructibly removable.
frame—a supporting structure.
generate—to create, produce, give rise to, and/or bring into existence.
Global Positioning System ("GPS")—a system adaptable to determine a terrestrial location of a device receiving signals from multiple satellites.
haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

heat—energy associated with the motion of atoms or molecules and capable of being transmitted through solid and fluid media by conduction, through fluid media by convection, and through an empty space and/or fluid by radiation.

human—a member of the species Homo sapiens.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

install—to connect or set in position and prepare for use.

insulated—separated from other electrical conductor by means of something that does not allow the passage of electrical energy.

intervention—an act of taking action about something in order to have an effect on its outcome.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

motion—a process via which something changes position from one location to another.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

open—allowing access to inside.

pair—two similar things used together.

passing through—extending in one side and out an opposite or another side of something.

pick up—to take hold of and move via an ascent from a lower elevation to a higher elevation.

plurality—the state of being plural and/or more than one.

portion—a part of a whole.

power supply—a device providing power to electrical and/or electronic equipment.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

project—to calculate, estimate, or predict.

provide—to furnish, supply, give, and/or make available.

receive—to get as a signal, take, acquire, and/or obtain.

receptacle—a port defined by an object, which port is constructed to receive a stem and thereby hold components together relative to each other.

recommend—to suggest, praise, commend, and/or endorse.

releasably—coupled so as to be substantially nondestructibly removable.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—to express a desire for and/or ask for.

restrain—to limit motion of something.

retract—to return a flexible cable from an extended position to a stored position.

reversible drive—an motor constructed to switch from a clockwise to a counterclockwise rotation, or vice versa.

rim—a wheel comprising a hub.

select—to make a choice or selection from alternatives.

sense—to detect or perceive automatically.

separate—to be apart.

set—a related plurality.

sheave—a grooved pulley wheel.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

spoke—a set of bars or wire rods connecting the center of a wheel to its outer edge.

spool—a reel on which a cable can be wound.

spool support—a structure to which a spool is mounted.

sprocket—a toothed wheel.

stem—a projecting part that extends from a surface.

store—to place, hold, and/or retain data, typically in a memory.

substantially—to a great extent or degree.

support—(n) a component that assists a system in performing defined tasks; (v) to assist something.

system—a collection of mechanisms, devices, machines, articles of manufacture, processes, data, and/or instructions, the collection designed to perform one or more specific functions.

tension—a pulling force transmitted axially on a cable.

tether—(n) a flexible cable coupleable to a drone system that provides energy to operate the drone system; (v) to couple via a flexible cable.

transmit—to send as a signal, provide, furnish, and/or supply.

travel—to move from a first location to a second location.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc.

A user interface can include one or more haptic elements such as, for example, elements utilizing tactile stimulus, force, pressure, vibration, motion, displacement, temperature, etc.

utilize—to put to use.

via—by way of and/or utilizing.

wide area augmentation system—a location identification system that utilizes a network of ground-based reference stations to measure small variations in the GPS satellites' signals. Measurements from the reference stations are routed to master stations, which queue the received Deviation Correction (DC) and send the correction messages to geostationary WAAS satellites in a timely manner (every 5 seconds or less). Those satellites broadcast the correction messages back to Earth, where WAAS-enabled GPS receivers use the corrections while computing their positions to improve accuracy.

wireless—any data communication technique that utilizes electromagnetic waves emitted by an antenna to communicate data (i.e., via an unguided medium), including such data communication techniques as sonar, radio, cellular, Bluetooth, cellular radio, digital cellular radio, ELF, LF, MF, HF, VHF, UHF, SHF, EHF, radar, microwave, satellite microwave, laser, infrared, etc., and specifically excluding human voice radio transmissions, the data communication technique having a carrier frequency ranging from about 1 Hz to about $2\times10^{14}$ Hz (about 200 terahertz), including all values therebetween, such as for example, about 40 Hz, 6.010 kHz, 8.7 MHz, 4.518 GHz, 30 GHz, etc. and including all subranges therebetween, such as for example, from about 100 kHz to about 100 MHz, about 30 MHz to about 1 GHz, about 3 kHz to about 300 GHz, etc. Wireless communications can include analog and/or digital data, signals, and/or transmissions.

wireless transceiver—a device constructed to transfer signals between sources and destinations without the use of wires.

without—substantially lacking.

working—a part of a system that performs a primary function of the system.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A method comprising:
    causing an article to be picked up and delivered via a working drone substantially without human intervention, the working drone coupled to a support drone via a tether, the working drone controlled via a wireless communication system that transmits signals from the support drone to the working drone, the wireless communication system constructed to communicate with a box that receives deliveries via the drone.

2. The method of claim 1, wherein:
    the wireless communication system utilizes Bluetooth.

3. The method of claim 1, further comprising:
    via wireless communication system, causing the box to open to receive a delivery via the working drone.

4. The method of claim 1, further comprising:
    via wireless communication system, causing an article to be picked up for delivery.

5. The method of claim 1, further comprising:
    via wireless communication system, causing an article to be dropped off in the box.

6. The method of claim 1, further comprising:
    via wireless communication system, causing a drone attachment to be picked up; causing the working drone to be coupled to a box to which an article is delivered, the working drone coupled to the box via a stem coupled to the working drone and a receptacle coupled to the box, the stem comprising a plurality of compressible protuberances from a cylindrical surface of the stem, the plurality of compressible protuberances constructed to engage with the receptacle.

7. The method of claim 1, further comprising:
via wireless communication system, causing a drone attachment to be dropped off.

* * * * *